US008638788B2

(12) United States Patent
Shah

(10) Patent No.: US 8,638,788 B2
(45) Date of Patent: Jan. 28, 2014

(54) REPLICATION MANAGEMENT FOR REMOTE MULTICAST REPLICATION NETWORK

(75) Inventor: Kunal R. Shah, San Francisco, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 210 days.

(21) Appl. No.: 13/302,789

(22) Filed: Nov. 22, 2011

(65) Prior Publication Data

US 2013/0128886 A1    May 23, 2013

(51) Int. Cl.
*H04L 12/28*    (2006.01)
*H04L 12/18*    (2006.01)
*H04L 12/56*    (2011.01)

(52) U.S. Cl.
CPC ............... *H04L 12/18* (2013.01); *H04L 45/16* (2013.01)
USPC ............ 370/390; 370/392; 370/432; 370/312

(58) Field of Classification Search
USPC .................................. 370/312, 390, 392, 432
See application file for complete search history.

(56) References Cited

U.S. PATENT DOCUMENTS

| | | | |
|---|---|---|---|
| 6,611,528 | B1 | 8/2003 | Farinacci et al. |
| 7,120,683 | B2 | 10/2006 | Huang |
| 7,333,488 | B2 | 2/2008 | Sumiyoshi |
| 7,417,990 | B2 | 8/2008 | Ikeda et al. |
| 7,983,205 | B1 | 7/2011 | Blease et al. |
| 8,054,766 | B2 | 11/2011 | Bou-Diab et al. |
| 8,375,414 | B2 | 2/2013 | Covey |
| 2002/0046271 | A1 | 4/2002 | Huang |
| 2004/0158872 | A1 | 8/2004 | Kobayashi |
| 2005/0152370 | A1* | 7/2005 | Meehan et al. ............... 370/393 |
| 2005/0195816 | A1 | 9/2005 | Sumiyoshi |
| 2006/0072572 | A1 | 4/2006 | Ikeda et al. |
| 2007/0147374 | A1 | 6/2007 | Lee et al. |
| 2010/0005499 | A1 | 1/2010 | Covey |
| 2010/0046516 | A1 | 2/2010 | Fernandez Gutierrez |

OTHER PUBLICATIONS

B. Fenner et al., "Internet Group Management Protocol (IGMP)/Mulitcast Listener Discovery (MLD)-Based Mulitcast Forwarding (IGMP/MLD Proxying")", Aug. 6, 2006, 12pages.
B. Cain et al., "Internet Group Management Protocol, Version 3", Oct. 2002, 50 pages, http://www.ietf.org/rfc/rfc3376.txt.
Liming Wei et al., "Remote Multicast Replication (RMR) Protocol <draft-wei-rmr-01.txt>," Dec. 2003, 14 pages, Internet Engineering Task Force, Internet-Draft, The Internet Society.

* cited by examiner

*Primary Examiner* — Paul H Masur
(74) *Attorney, Agent, or Firm* — Blakely Sokoloff Taylor & Zafman, LLP

(57) ABSTRACT

A router receives a leave message from a host on a subscriber circuit. The leave message indicates a request to stop receiving a multicast stream that is associated with a group object. The interface between the router and network elements including, but not limited to, a remote multicast replication interface. A group specific query is then sent on the subscriber circuit, and is directed to hosts on the subscriber circuit and regards only the multicast group of the received request. Next the group object association with the subscriber circuit is removed from the record at the router if, in response to the group specific query, no host of the subscriber circuit reports receiving the traffic stream corresponding to the multicast group identified in the leave message.

20 Claims, 6 Drawing Sheets

REPLICATION MANAGEMENT FOR REMOTE MULTICAST REPLICATION NETWORK

FIELD OF THE INVENTION

The embodiments of the invention relate to a multicast replication in a remote multicast replication system. Specifically, the embodiments of the invention relate to the use of call admission and management for group object in the remote multicast system.

BACKGROUND

Multicasting is used to bring broadcast style video and audio streaming to a large audience all at the same time. As compared to unicasting, in which each host receives its own stream, in multicasting every host receives the same content at about the same time, typically through an internet connection. The Internet Group Management Protocol (IGMP) and Multicast Listener Discovery (MLD) have been established to provide standard formats and protocols for multicasting. These protocols are now used to bring broadcast television style entertainment to the home using internet protocols.

In multicast, a separate stream is sent on each subscriber circuit. When there are millions of viewers, millions of independent subscriber circuits and independent streams must be maintained. In order to reduce the infrastructure required to maintain a large number of streams, Remote Multicast Replication (RMR) has been developed. RMR allows a single stream to be sent from a central router to a remote access node. The router obtains the stream from its source. The access node replicates the single stream onto many subscriber circuits. This avoids the need to replicate the streams from the router to each subscriber circuit. It there are many subscribers receiving a single stream from the same access node, the physical requirements of the data pathways may be greatly reduced.

By moving the generation of the stream at the router away from the access node which is connected directly to the subscriber circuits, stream management can be harmed. The connection between requesting the stream and generating the stream is broken by putting an RMR interface between the access node and the router.

In conventional multicast replication, multicast group traffic is replicated only on the circuits on which IGMP joins are received. RMR provides a separate interface for sending multicast traffic to interested hosts by sending the multicast traffic from the edge router to the access node out on an interface other than the one on which IGMP joins are received. The multicast traffic is replicated to the interested hosts by the downstream access node. This avoids using the link between the access node and the edge router for sending multicast traffic. It allows for a separate VLAN to be used for sending multicast traffic. Another VLAN may be used for IGMP joins, leaves, and queries.

In RMR, the interface used for sending out multicast traffic and its context are configured in an IGMP service profile. The configuration enables the RMR interface for multicast and binds it. The IGMP service profile created in the initial configuration is then used by subscribers when they come up. A subscriber, e.g. a CLIPS (Clientless Internet Protocol)/PPPOE (Point-to-Point Protocol over Ethernet) subscriber, uses the service profile to send a report which can serve as a join request or a leave request to receive or stop receiving a particular stream. The stream is associated with a group object.

When an IGMP report is received, if a group object does not exist on the RMR circuit, meaning that the requested stream is not being streamed to the appropriate access node, then a group object corresponding to the group present in the report is created on the RMR circuit. However, the same group object is not created on the subscriber circuit on which the IGMP report is received.

If a group object is created on the RMR circuit, meaning that a particular stream is added to those sent through the RMR circuit, then IGMP notifies PIM (Protocol Independent Multicast) to use the RMR circuit as the OIF (Outgoing Interface) for forwarding traffic for the multicast group. On the other hand, when an IGMP leave is received on a subscriber, in order to determine if there are other interested hosts for the group, an IGMP group specific query is sent out on the RMR circuit to all of the hosts for a group.

The separation between IGMP and RMR and between router and access node can prevent parts of the system from being aware of the status and connections of other parts of the system. It can also make it difficult for an operator to measure and analyze system behavior. As an example, in IGMP, group objects are associated only with the RMR circuit. As a result, an operator cannot see all the groups that are associated with a subscriber and it is not possible to determine the groups that a subscriber is viewing, nor is it possible to determine current status and assess many faults for a particular subscriber.

Similarly, when a group object is created and displayed on the RMR circuit, the creation of the group object gives an incorrect indication that the IGMP report was received on the RMR circuit. There is also no way to account for the multicast bandwidth used by a subscriber on a subscriber circuit. This frustrates subscriber level call admission control. In multicast streaming, call admission control is useful to ensure that the multicast traffic does not impact the unicast traffic flowing on the same subscriber circuit. Call admission control also helps to ensure quality of service and adherence to subscription levels.

The separation between IGMP and RMR also creates additional overhead signaling. An IGMP group specific query is sent in response to an IGMP leave received from a host on that host's subscriber circuit, but the IGMP group specific query is sent out on the RMR circuit and therefore is replicated to all of the subscriber circuits that are associated with the group. The IGMP group specific query packet uses a multicast group address corresponding to a group object as the destination IP address for sending queries. In response to this query, the hosts on all the subscriber circuits receiving the query will respond to the query. This may result in more responses being received than are necessary for the one IGMP leave request.

SUMMARY

Embodiments of the present invention provide in one example a method at a router coupled to sources of multicast streams and to multicast consumer hosts through one or more network elements for managing multicast streams sent to hosts through the one or more network elements using subscriber circuits. The method includes receiving a report from a host on a subscriber circuit. The subscriber circuit is coupled between the router and the host. The report indicates a request to receive a multicast stream that is associated with a group object. The group object is associated with the subscriber circuit in a record at the router. A leave message is received from a host on the subscriber circuit that indicates a request to stop receiving a traffic stream corresponding to a multicast group identified in the leave message. A group specific query is then sent on the subscriber circuit, and is directed to hosts on the subscriber circuit and regards only the multicast group of the received request. Next the group object association with the subscriber circuit is removed from the record at the router if, in response to the group specific query, no host of the subscriber circuit reports receiving the traffic stream corresponding to the multicast group identified in the leave message.

In another embodiment of the invention a non-transitory computer readable storage medium includes instructions, that when executed by the computer, cause the computer to perform multiple operations. The operations include receiving a report from a host on a subscriber circuit. The subscriber circuit is coupled between the router and the host. The report indicates a request to receive a multicast stream that is associated with a group object. The group object is associated with the subscriber circuit in a record at the router. A leave message is received from a host on the subscriber circuit that indicates a request to stop receiving a traffic stream corresponding to a multicast group identified in the leave message. A group specific query is then sent on the subscriber circuit, and is directed to hosts on the subscriber circuit and regards only the multicast group of the received request. Next the group object association with the subscriber circuit is removed from the record at the router if, in response to the group specific query, no host of the subscriber circuit reports receiving the traffic stream corresponding to the multicast group identified in the leave message.

In another embodiment of the invention, a router is coupled to sources of multicast streams and to multicast consumer hosts through one or more network elements. The router is configured to manage multicast streams sent to hosts through the one or more network elements using subscriber circuits. The router includes an ingress module to receive a report from a host on a subscriber circuit that is coupled between the router and the host. The report indicates a request to receive a multicast stream that is associated with a group object. The ingress module is further to receive a leave message from a host on the subscriber circuit that indicates a request to stop receiving the traffic stream. The router has an egress module to send a group specific query on the subscriber circuit that is directed to hosts on the subscriber circuit and regards only the group object of the received leave message. The ingress module also receives reports from hosts on the subscriber circuit in response to the query. The router also has a network processor to associate the group object with the subscriber circuit in a record at the router and to remove the group object association with the subscriber circuit from the record at the router if no host of the subscriber circuit is receiving the multicast of the group object.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
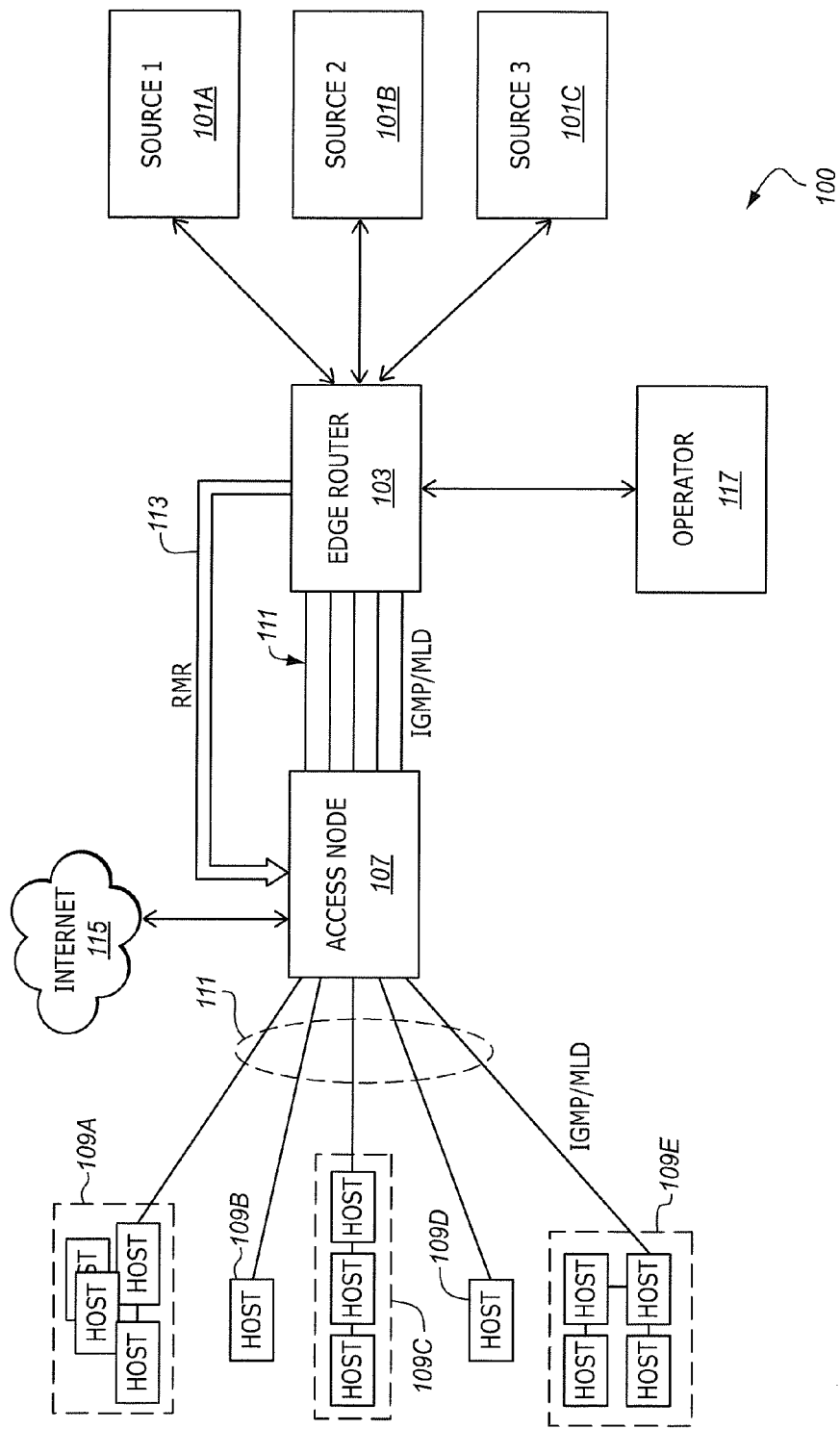
FIG. 1 is a diagram of a multicast network according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Instead of creating a group object on an RMR circuit, the group object may be created on each subscriber circuit on which an IGMP report is received. This allows for group associations and reference counters to be established corresponding to each unique group that is supported on the RMR circuit.

By creating group objects on individual subscriber circuits, an operator can see all the groups that are associated with a subscriber. This can eliminate any ambiguity about the circuit on which an IGMP report is received. The group objects allow the multicast bandwidth used by each subscriber to be tracked and accounted for. As a result, it is possible to provide a subscriber level admission control based on multicast bandwidth usage at the edge. When a host requests more bandwidth than it is allowed, new IGMP Reports from that host can be discarded. This ensures quality service for that subscriber circuit but also allows ensures that the multicast traffic does not impact unicast traffic, including telephony and web browsing.

In addition by creating IGMP group objects on the requesting subscriber circuit, an IGMP Leave received later on the same subscriber circuit can be connected with the previously created group object. This can allow an IGMP group specific query to be sent out only on the subscriber circuit from which the leave message was received. Only the hosts on that subscriber circuit will see the query and respond to it. This reduces IGMP traffic and reduces the number of responses that must be analyzed to find the relevant results from the query.

FIG. 1 is a diagram of one embodiment of a multicast network. The multicast network 100 includes several multicast sources 101A-C, a multicast router 103, such as an edge router, a proxy device 107, such as an access node and several multicast subscribers 109A-E. The diagram shows only three sources and five subscribers, however, there may be more or fewer and other intermediate devices or other multicast routers and proxy devices can be part of the network in between the multicast sources and the multicast subscribers. The illustrated embodiment is presented by way of example and for sake of clarity, additional devices and variations have not presented. The principles and structures described herein in regard to this embodiment are provided for purposes of illustration and may be adapted to other configurations.

Each of the multicast sources 101A-C can be provided by any type of computing device such as a server, a desktop computer, a laptop computer, a portable device, etc. The multicast sources 101A-C can each be provided by separate devices or by any combination of devices including a single device. The multicast sources 101A-C provide content using applications running on these devices for the benefit of the multicast subscribers. The multicast sources are available through a multicast group address using IGMP or MLD or a similar protocol. The provided content can be video content, audio content or other types of content. In one example embodiment, each multicast source is a television channel in an IPTV (Internet Protocol Television) system.

The upstream multicast router 103 can be any type of networking element including an edge router or similar type of routing device. The upstream multicast router can be directly or indirectly connected to each of the multicast sources over a network. The upstream multicast router 103 provides these multicast sources 101A-C to each of the downstream devices connected to the upstream multicast router. In an example embodiment, a single proxy device 107 is shown, however, the upstream multicast router 103 can have any number of connections to downstream devices through any one or more proxy devices. Each of these connections represents a separate subscriber circuit 111 through the proxy device and between the upstream multicast router 103 and the downstream device 109. In the described embodiments, the subscriber circuits are IGMP circuits operating using MLD. The upstream multicast router 103 may maintain a membership database for each of the downstream devices connected to the upstream multicast router 103.

The multicast router 103 and the access node are also connected by an RMR (Remote Multicast Replication) interface 113. This interface carries the streamed multicast media from the router to the access node. There may be a single stream for each group object which is then replicated onto each subscriber circuit that is to receive the stream. Placing the replication at the access node instead of at the router, reduces the network resources required to provide streams to all of the subscribers that request the same stream.

The access node 107 is connected to the upstream multicast router 103 by a network and is either directly or indirectly coupled to the plurality multicast subscribers 109A-C over the same or another network. The access node 107 manages the replication of all of the streams that it receives through the RMR interface. The access node 107 also maintains an aggregate state of the requested multicast sources for all of the subscriber circuits 111 to which it is connected.

Multicast subscriber nodes 109A-C are composed of one or more streaming, IPTV, Internet, or telephony hosts. The hosts may be connected through each other, through a router or individually each connected to the same subscriber circuit. Examples of hosts include computing devices, such as set top boxes, laptops, handhelds, desktops and similar computing devices, as well as wired telephones and data streaming devices. A host may also include a wireless access point or cellular telephony picocell. These hosts can consume the multicast sources 101A-D as well as unicast data bandwidth from for example, the Internet 115. The multicast subscribers nodes may include set top boxes for an IPTV system as well as handheld, telephone, and slate computing device that receive IPTV media. In this embodiment, the multicast sources are IPTV channels and the multicast subscribers manage the set of requested channels which can change frequently based on the user interaction with the set top box. The multicast sources 101A-D, upstream router 103, proxy device 107 and subscriber nodes 109A-C can be in communication with each other over any combination of networks including local area networks (LANs), wide are networks (WANs), such as the Internet, or similar communication systems. These networks can include any combination of wireless and wired components and network elements.

An IPTV system typically includes an operator 117 connected to either the edge router 103, the access node 107 or both. The operator may be an IPTV service provider, Internet service provider or third party operator. Through the connection, whether direct or indirect, with the router and access node, the operator can provide subscription information, quality or service management, network administration and diagnostic services for IPTV, Internet, and telephony service and other services and data. The operator may also provide a connection through the router or access node to the telephony network for e.g. POTS (Plain Old Telephone Service) or other telephony services, such as picocell cellular telephony service.

Figure 2:
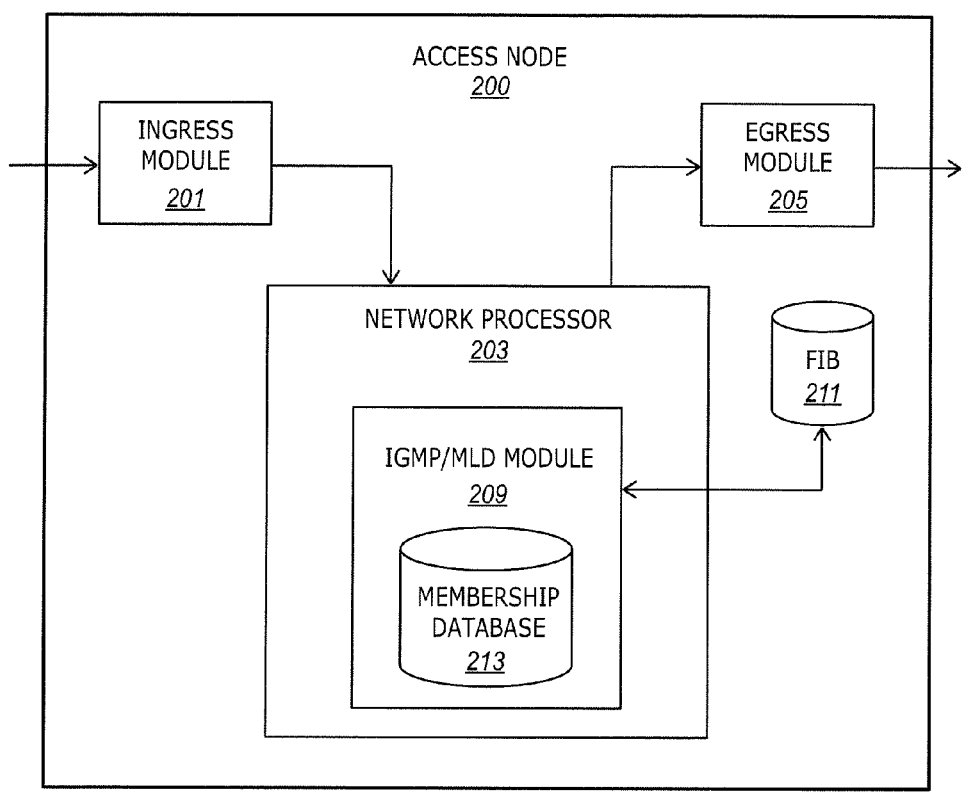
FIG. 2 is a block diagram of a network element such as an access node according to an embodiment of the invention.

FIG. 2 is a diagram of one embodiment of a network element functioning as the access node, however other network elements may have a similar configuration. The network element 200 includes an ingress module 201, an egress module 205 and a network processor 203. The ingress module 201 handles the processing of data packets being received by the network element at the physical link and data link level. The egress module 205 handles the processing and data packets being transmitted by the network element at the physical link and data link level. The ingress and egress modules communicate with subscribers through IGMP and with the edge router through IGMP and through the RMR interface. These two interfaces may be provided by different ingress and egress modules, however a single module is shown for simplicity.

The network processor 203 handles the routing, forwarding and higher level processing of the data traffic. The network processor 203, and an Internet Group Management Protocol (IGMP)/Multicast Listener Discover Module 209.

The IGMP/MLD module 209 manages the membership database 213 and may manage a forwarding information base 211 (FIB). The IGMP/MLD module 209 receives IGMP and MLD packets that include membership reports from the downstream multicast subscriber nodes. These membership reports are analyzed to determine changes in the membership data and to update a membership database 213 within the IGMP/MLD Module 209 and the FIB 211. The IGMP/MLD module 209 may also pass the changes to the multicast membership data to the upstream multicast router.

A standard IGMP membership report for IGMPv3 includes a header with a Type field, two Reserved fields, a Checksum field, and a number of group records field. The body of the message includes a set of group records. The individual group records include a header section and body section. The header section includes a Record Type field, Auxiliary Date Length field, Number of Sources field and Group Address field. The body contains a set of source identifiers such as IP addresses for the end stations or servers that provide the source data.

This layered structure requires is parsed by the IGMP module to identify the source identifiers in the message and to maintain a source state based on these source identifiers.

Similar data may be received from MLD membership reports when a subscriber mode is using Internet Protocol v6 to communicate with the proxy device or access node. The access node may track the number of requests for each of the multicast sources and correlate the upstream router state and aggregate subscriber state by mode for each of the multicast sources. The sources may also be correlated with forwarding and pruning modes. A forwarding mode indicates that the corresponding multicast source is being forwarded to a proxy device by the upstream multicast router and ultimately to at least one subscriber node. The pruned state indicates that the upstream multicast router is not sending the corresponding multicast source to the proxy device and the corresponding multicast source is not being sent to any subscriber node.

Figure 3:
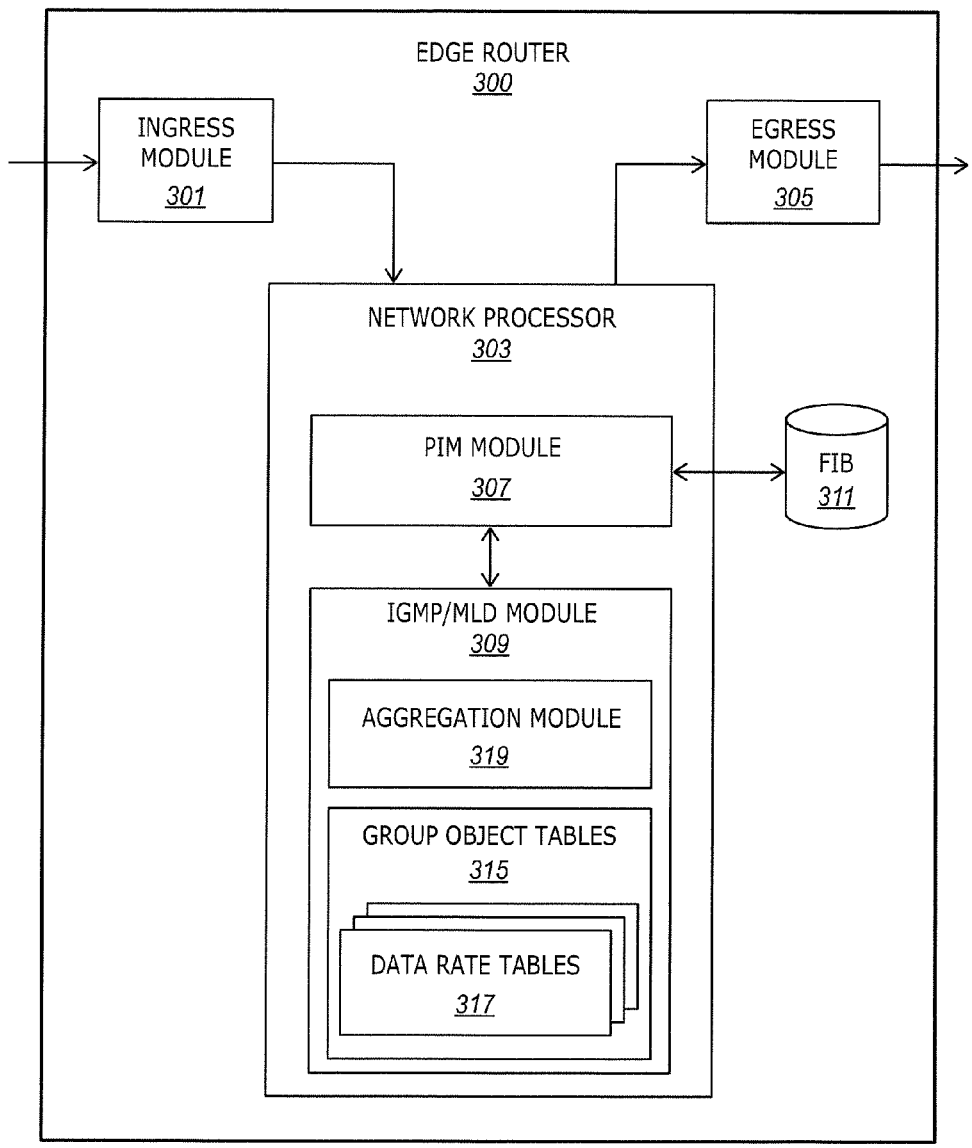
FIG. 3 is a block diagram of a network element such as an edge router according to an embodiment of the invention.

FIG. 3 is a diagram of one embodiment of a network element functioning as the edge router, however other network elements may have a similar configuration. The edge router 300 includes an ingress module 301, an egress module 305 and a network processor 303. The ingress module 301 handles the processing of data packets being received by the network element at the physical link and data link level. The egress module 305 handles the processing and data packets being transmitted by the edge router at the physical link and data link level. The ingress and egress modules communicate with one or more access nodes through IGMP and through the RMR interface. The edge router can also communicate directly with subscribers and particular hosts on a subscriber circuit.

The network processor 303 handles the routing, forwarding and higher level processing of the data traffic. The network processor 303 can execute or include a Protocol Independent Multicast (PIM) module 307 and an Internet Group Management Protocol (IGMP)/Multicast Listener Discover Module 309. These are used to manage group object tables 315, data rate tables 317 and counters as described in more detail below. The PIM module 307 manages a forwarding information base 311 (FIB). In other embodiments, the PIM module 307 and IGMP/MLD module 309 may manage the FIB in combination. The IGMP/MLD module 309 may also pass changes to the multicast membership data to other network nodes and also to the PIM module 307, which may sends them to the other nodes.

The network processor also manages streams over the RMR interface determining the streams that are sent to each access node. The IGMP/MLD module 309 receives IGMP and MLD packets that include membership reports from the downstream multicast subscriber nodes. These membership reports are analyzed to determine changes in the membership data, to update the tables and also to formulate queries to hosts on different subscriber circuits. The IGMP/MLD module 309 may also receive changes to the multicast membership data from access nodes or from a PIM module either at an access node or in another location.

Membership information may be aggregated by an aggregation module 319. Changes to membership data from the IGMP/MLD module 309 can be combined in parallel with the IGMP/MLD module 209 updating the forwarding information bases 211, 311 and membership database 213. Tables (not shown) may be used to track the overall numbers of includes and excludes for each source as well as for a generic 'all sources' for a corresponding interface, that can be updated quickly and used as a basis for notifying other nodes in the multicast system of the detected changes.

The aggregate multicast source membership may be maintained by incrementing and decrementing the appropriate counters for the corresponding sources such that the aggregate multicast source membership state is maintained defining the multicast sources to be forwarded to or blocked from a plurality of multicast subscriber nodes. An aggregated subscriber state may be tracked by mode for each multicast source. Alternatively, simpler counters may be used, depending on the particular implementation and the complexity of the tracking that is desired.

Figure 4:
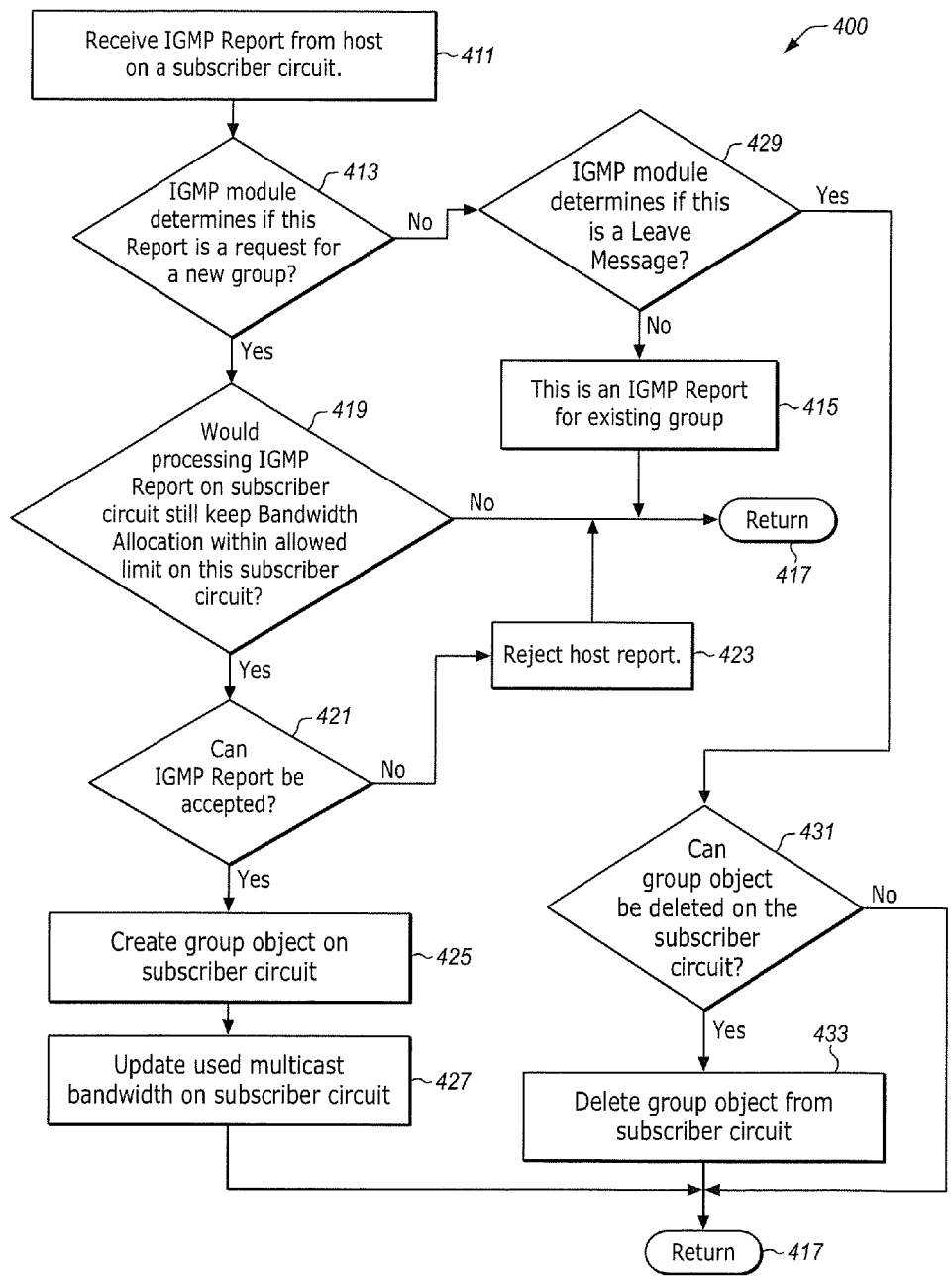
FIG. 4 is a process flow diagram of establishing and processing group object host/host tables according to an embodiment of the invention.

FIG. 4 shows a process 400 for establishing and maintaining group object/host tables. At block 411, the edge router or a similar device receives an IGMP Report from a host on a subscriber circuit. The report in this example process is a report of membership in the group that receives a particular multicast stream.

At block 413, the IGMP module determines whether the received Report is a request for a new group or for some other purpose. If it is not a request for a new group, then the process flows to determine if the Report is another type of report at block 429.

If the request is for a new group then at block 419, the IGMP module determines whether processing the IGMP Report on the subscriber circuit would keep the bandwidth allocation for that subscriber circuit within its allowed limit. If not, then the process discards the report and returns to wait for the next report. The allowed bandwidth allocation limit may be a physical limitation of the physical connection used for a subscriber circuit or it may be function of subscription and priority levels allocated to or purchased by a particular subscriber. The allowed limits can be maintained in a table and compared to the total bandwidth being requested as described in more detail below.

At block 421, the IGMP module determines whether the IGMP Report will be accepted. The IGMP Report might be rejected because there is insufficient bandwidth on the subscriber circuit or it may be rejected for subscription, permission or availability reasons. Certain sources may be unavailable or require additional conditions, such as higher subscription or extra fees. If the IGMP Report is not accepted, then at block 423 it is rejected and the process flow returns to wait for the next report.

If the IGMP Report is accepted, then a group object is created on the subscriber circuit at block 425. This may be done by maintaining a table 315 or in a variety of other ways. At block 427, the used multicast bandwidth on the subscriber circuit is updated to reflect the addition of the new group object. The multicast bandwidth for each subscriber circuit can be maintained in the data rate tables 317 of the edge router or in any other suitable location. Table 1 shows a simplified example of how total data rates for each subscriber circuit might be captured and tracked in the data rate tables 317.

TABLE 1

| Subscriber Circuit ID | DR limit | DR reserved | DR used |
|---|---|---|---|
| 0001 | 6 MB/s | 0 MB/s | 3.7 MB/s |
| 0002 | 12 MB/s | 2 MB/s | 8.4 MB/s |

In the example of Table 1, only two subscriber circuits with the IDs of 0001, and 0002 are shown, however, there may be many more. Circuit 0001 has purchased or has equipment capable of 6 MB/s and has no amount reserved. The data rate being used is 3.7 MB/s. This might correspond to a high definition IPTV group object plus a low definition IPTV video on another host. Circuit 0002, on the other hand has a higher allocation of bandwidth, up to 12 MB/s and a higher reserved amount of 2 MB/s. The reserved data rate may be for telephone, cellular telephone picocell, data, or unicast internet access, etc. In Table 1, circuit 0001 may not have purchased telephone or internet service and therefore nothing has been reserved. Circuit 002 also has a higher amount of bandwidth being used at 8.4 MB/s. This might correspond to several video and audio multicast streams together with Internet use or any other combination or data services.

Typically, the DR limit and DR reserved values will change only very rarely, for example when a subscription or hardware change is made. The DR used value, however, may be changed every time a group is created on a subscriber or a group is deleted from the subscriber.

In addition to creating a group object on the subscriber circuit, the requested group object may be added to the RMR circuit so that it can be streamed to the host. If the group object is already being streamed to a different host, then it does not need to be added. To add the group object, the edge router 103 sends a request for the stream to the source 101 corresponding to the requested stream. The source starts streaming the group object and the router then directs the stream to the RMR interface. The access node 107 will pick up the stream from the RMR interface and replicate it onto each subscriber circuit 111 which is to receive the stream.

At 429, the edge router through the IGMP/MLD module 309 determines whether the received IGMP message is a Leave message from a host. If the message is neither a Join request for a new group nor a Leave, then the report is an IGMP Report for an existing group. At block 415, the existing group object state timer is refreshed at block 415 and the process returns at 417 to wait for the next received report. The Report may be subjected to further tests before the process returns so that other types of reports may also be acted upon.

The group object state timer can be associated with the group object mentioned in the request or it can be a generic state timer. In one embodiment, the state timer determines an elapsed time to a next group specific query to the hosts associated with the corresponding group object. When the state timer is refreshed, then it starts counting over again increasing the time until the next group query. In one embodiment each group is tracked separately with its own timer. In another embodiment, a single timer is used for all groups and the group specific query is sent to all hosts.

If the message is a Leave, then the module determines at block 421 whether the group object can be deleted on the subscriber circuit. Deleting relates to deleting the association made at block 425 and 427. It may not be possible to delete the group object for a variety of different reasons. One such reason is because the group object is being received by another host on the same subscriber circuit. The edge router can determine whether the group object is still associated with other hosts on the subscriber circuit through IGMP group specific queries or in other ways, such as an inquiry to the access node. If the group object cannot be deleted, then the process returns to wait for the next report.

If the group object can be deleted, then at block 423, the group object associated with the leave is deleted from subscriber circuit and the bandwidth usage determined for the subscriber circuit is deleted from the data rate tables. The records at the router now show that the subscriber circuit is not receiving the group object and is not consuming any of its bandwidth allocation in order to receive the group object.

Figure 5:
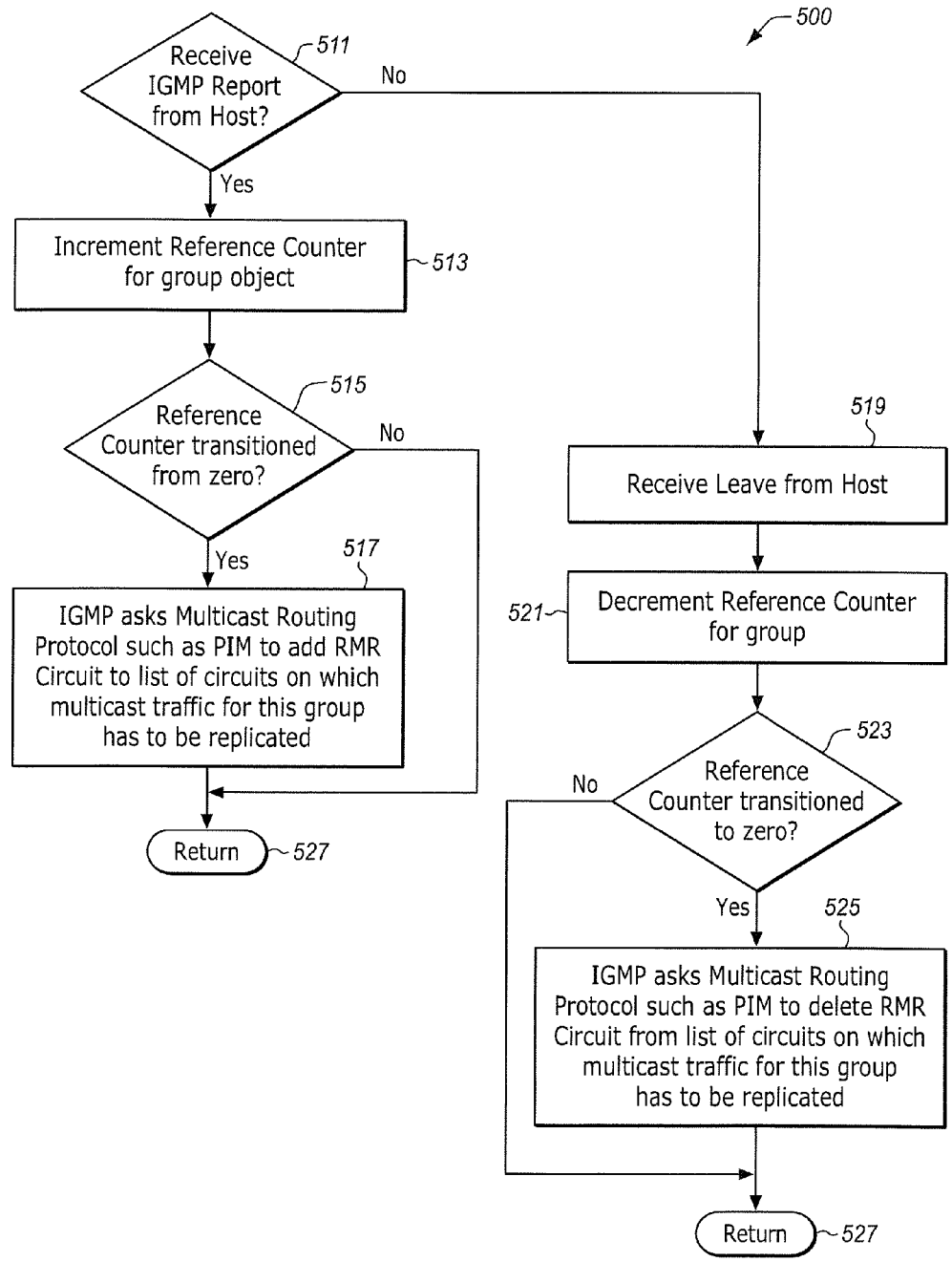
FIG. 5 is a process flow diagram of using a counter to delete group objects from an interface according to an embodiment of the invention.

FIG. 5 is a process flow diagram that shows how a counter can be used to determine when a group object can be deleted from the RMR interface. In FIG. 5, at 511, if a message is an IGMP Report received from a host on its respective subscriber circuit, then at 513, if the report is accepted and the host can receive the group object as described, for example, in FIG. 4, then a reference counter for the requested group object is incremented. This is the reference counter with respect to the Remote Mulitcast Replication (RMR) Circuit via the Access Node. If the message is not an IGMP Report then the process skips down to 519.

The value in the reference counter can be tracked and at 515 if the reference counter transition from zero due to being incremented, then this is a new group object. The group object corresponds to a particular multicast stream from a particular source and this may all be determined and tracked using conventional IGMP/MLD processes. The edge router will first contact the source to obtain the new stream and add the stream to the RMR interface. The IGMP will also ask, using for example the Multicast Routing Protocol such as PIM to add the RMR Circuit to the list of circuits on which the multicast traffic for this group has to be replicated. The access node, will receive the request and replicate the group object from the RMR interface to the subscriber circuit.

If the reference counter was already non-zero, then the source should already be supplying the stream to the edge router which is already applying the stream to the RMR interface. The access node is already replicating the stream to other hosts. The result of the IGMP report will be that the access node will also replicate the object to the requesting host. This can also be done using the Multicast Routing Protocol. The process then returns to the start.

The reference counter as shown at 513, 515, and 517 allows the edge router to determine whether a requested group object is new and whether it needs to be added to the RMR circuit. The reference counter may also be used to determine when to remove a group object from the RMR interface.

At block 519, the edge router through its IGMP/MLD module receives an IGMP Leave message from a host. In this case at 521, the appropriate reference counter is decremented. In other words, the group object reference in the Leave is obtained and the counter for that group with respect to the RMR circuit via the Access Node is decremented. At block 523, it is determined whether that reference counter has transitioned to zero.

If the reference counter has not zero and has not transitioned to zero, then the process flow returns to look at the next IGMP Report. However, at 525 if the reference counter has transitioned to zero, then IGMP may ask the Multicast Routing Protocol such as PIM to delete the RMR Circuit from the list of circuits on which the multicast traffic for this group has to be replicated. This removes the group object from the RMR interface.

The FIG. 5 process allows traffic demands on the RMR interface to be managed. The RMR can stream only a limited number of objects to the corresponding access nodes. When there are no longer any hosts receiving the stream, then it may safely be removed from the RMR interface until it is requested again. A reference counter for each stream allows the number of hosts receiving a stream to be tracked. This allows the stream to be removed when the corresponding counter transitions to zero, indicating that zero hosts are requesting the stream.

The reference counter may take a variety of different forms. In one example a simple table of group objects and the counter values, as shown in Table 2, may be used. In another embodiment aggregate values may be used as the counter values. For aggregate values, a plurality of counters may be incremented to track an aggregate state of the subscriber circuit for all multicast sources. This approach is described in more detail above in the context of aggregation.

TABLE 2

| Group Object ID | Counter Value |
|---|---|
| 0001 | 548 |
| 0002 | 25 |
| 0003 | 0 |
| 0004 | 87 |

Figure 6:
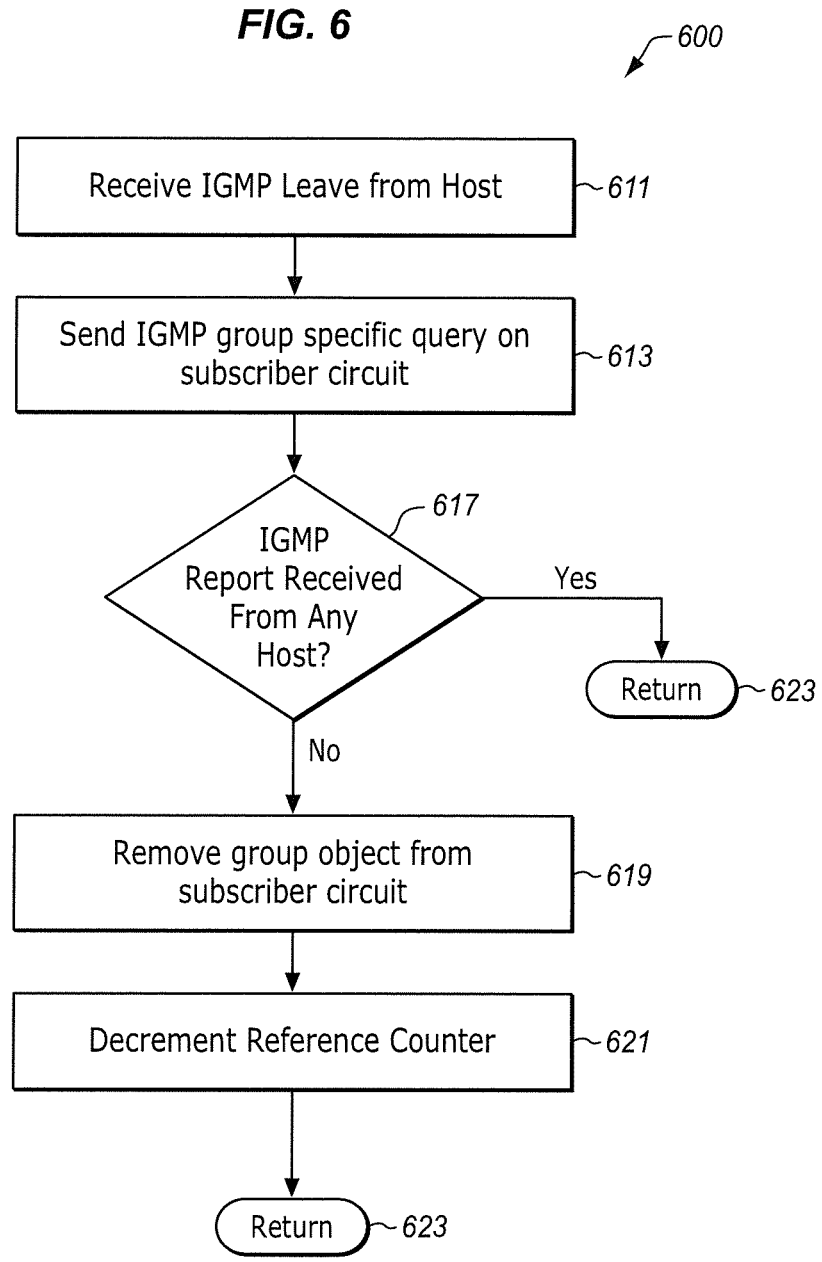
FIG. 6 is a process flow diagram of processing a group query according to an embodiment of the invention.

FIG. 6 is a process flow diagram for processing group query using less resources than is allowed for in IGMP and MLD. In FIG. 6, an IGMP Leave is received from a host at 611. This may be the same operation shown as 429 and 519 in FIGS. 4 and 5, respectively. Based on this received report at 613 the IGMP module sends an IGMP group specific query on the same subscriber circuit that sent the Leave. It is not necessary to send this report on the RMR circuit.

At 617, any IGMP Reports that respond to the group specific query are received. These are received only on the subscriber circuit on which the query was sent. The received Reports indicate whether any host is still interested in receiving the multicast traffic for the group. The group for this determination is the group referenced in the Leave at 611. If there are hosts still interested in receiving the multicast traffic, then the process returns at 623.

If no IGMP Reports are received, then there are no more hosts receiving the traffic, then at 619, the group object may be removed from the subscriber circuit. At 621, the reference counter for the group with respect to the RMR circuit of FIG. 5 may be decremented via the Access Node. The process then returns.

With block 621, FIG. 6 shows an interconnection to FIG. 5. In FIG. 5, at 521, the reference counter is decremented based upon receiving an IGMP Leave. If there is only one host on a subscriber circuit, or if each host can be independently identified and tracked, then this is an accurate process. Otherwise, a group specific query may be used. The group specific query allows every subscriber circuit associated with a group object to be queried for interest in receiving a multicast stream. The hosts that respond can then be added up to determine the correct value for the reference counter. Alternatively, the replies for the subscriber circuit of interest can be parsed to determine if there are any hosts on that one particular circuit that wish to receive the stream.

Because there may be many subscriber circuits associated with a group object, an IGMP group specific query may cause many queries to be sent to many hosts. While this might be manageable using the replication hardware of the access node, it is problematic when the replies are received. A large number of replies are received in the form of IGMP Reports all at about the same time. Using the process of FIG. 6, the number of IGMP Reports received in reply may be greatly reduced.

As shown in FIG. 6, the subscriber circuit upon which the IGMP Leave is received at 611 is noted. The group specific query is then sent only on that one subscriber circuit. Replies are received only from hosts on that subscriber circuit. This greatly reduces the traffic demands and the processing demands on the system. At the same time, it allows for a high degree of precision to be maintained in the reference counter.

The same process may be applied to incrementing the reference counter. Upon receiving a IGMP Report requesting a stream, the IGMP Module may send an IGMP group specific query on the same subscriber circuit to determine whether any hosts on that subscriber circuit are already receiving the stream. If not, then the reference counter is incremented to reflect a new subscriber circuit for the stream. If so, then the reference counter is not incremented because the reference counter shows the number of subscriber circuits that are associated with a group object. This subscriber circuit is already associated with the group object.

As described above, a group object may be created on each subscriber on which an IGMP Report is received. At the same time, a reference counter on the RMR circuit for the corresponding group may be incremented. Conversely, the group object is deleted on each subscriber on which an IGMP Leave is received and the reference counter on the RMR circuit for the corresponding group is decremented.

IGMP notifies PIM to add the RMR circuit as the OIF, only when the reference counter for a group object on the RMR circuit goes from a zero to a non-zero value. IGMP notifies PIM to delete the RMR circuit as the OIF, only when the reference counter for a group object on the RMR circuit goes from a non-zero to a zero value. As long as the reference counter for the group is non-zero, multicast traffic for that group or source-group will continue to flow out on the RMR circuit. Reference counting may ensure that multicast traffic flows out on the RMR circuit from the time the first subscriber becomes interested in a multicast group to the time the last subscriber loses interest in a multicast group. For IGMPv3/MLDv2 the reference counting on the RMR circuit may be done for a source-group pair. This can be done using aggregation tables as described above, or in a variety of other ways.

The operations of this and other flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Network elements are commonly separated into a control plane and a data plane (sometimes referred to as a forwarding plane or a media plane). In the case that the network element is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., Border Gateway Protocol (BGP), Interior Gateway Protocol(s) (IGP) (e.g., Open Shortest Path First (OSPF), Routing Information Protocol (RIP), Intermediate System to Intermediate System (IS-IS)), Label Distribution Protocol (LDP), Resource Reservation Protocol (RSVP)) that communicate with other network elements to exchange routes and select those routes based on one or more routing metrics.

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols.

For layer 2 forwarding, the network element can store one or more bridging tables that are used to forward data based on the layer 2 information in this data.

Typically, a network element includes a set of one or more line cards, a set of one or more control cards, and optionally a set of one or more service cards (sometimes referred to as resource cards). These cards are coupled together through one or more mechanisms (e.g., a first full mesh coupling the line cards and a second full mesh coupling all of the cards). The set of line cards make up the data plane, while the set of control cards provide the control plane and exchange packets with external network element through the line cards. The set of service cards can provide specialized processing (e.g., Layer 4 to Layer 7 services (e.g., firewall, IPsec, IDS, P2P), VoIP Session Border Controller, Mobile Wireless Gateways (GGSN, Evolved Packet System (EPS) Gateway)). By way of example, a service card may be used to terminate IPsec tunnels and execute the attendant authentication and encryption algorithms.

Certain network elements (e.g., certain edge network elements) internally represent subscriber end stations (or sometimes customer premise equipment (CPE) such as a residential gateway (e.g., a router, modem)) using subscriber circuits. A subscriber circuit uniquely identifies within the network element a subscriber session and typically exists for the lifetime of the session. Thus, a network element typically allocates a subscriber circuit when the subscriber connects to that network element, and correspondingly de-allocates that subscriber circuit when that subscriber disconnects. Each subscriber session represents a distinguishable flow of packets communicated between the network element and a subscriber end station (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for DSL services and requires installation of a PPP client that enables the subscriber to enter a username and a password, which in turn may be used to select a subscriber record. When DHCP is used (e.g., for cable modem services), a username typically is not provided; but in such situations the MAC address of the hardware in the subscriber end station (or CPE) is provided. The use of DHCP and CLIPS on the network element captures the MAC addresses and uses these addresses to distinguish subscribers and access their subscriber records.

What is claimed is:

1. A method at a router coupled to sources of multicast streams and to multicast consumer hosts through one or more network elements, an interface between the router and the one or more network elements including, but not limited to, a Remote Multicast Replication (RMR) interface, the method for managing multicast streams sent to hosts through the one or more network elements using subscriber circuits, the method comprising:

receiving a report from a host on a subscriber circuit, the subscriber circuit being coupled between the router and the host, the router being coupled with the one or more network elements through the RMR interface, the report indicating a request to receive a multicast stream, the multicast stream being associated with a group object;

associating the group object with the subscriber circuit in a record at the router;

receiving a leave message from a host on the subscriber circuit, the message indicating a request to stop receiving a traffic stream corresponding to a multicast group identified in the leave message;

sending a group specific query on the subscriber circuit, the group specific query being directed to hosts on the subscriber circuit and regarding only the multicast group of the received leave message;

removing the group object association with the subscriber circuit from the record at the router if, in response to the group specific query, no host of the subscriber circuit reports receiving the traffic stream corresponding to the multicast group identified in the leave message.

2. The method of claim 1, further comprising maintaining the group object association with the subscriber circuit in the record at the router if at least one host of the subscriber circuit is receiving the multicast stream of the group object.

3. The method of claim 2, further comprising sending the multicast stream to the network element through the RMR interface, if at least one Multicast Listener Discovery Report is received from a host on the subscriber circuit.

4. The method of claim 1, wherein the reports are at least one of Internet Group Management Protocol reports and Multicast Listener Discovery protocol reports.

5. The method of claim 1, further comprising logging the received requests for the benefit of a network operator.

6. The method of claim 1, further comprising:
incrementing a reference counter associated with the group object upon receiving the request to receive the multicast stream; and
adding the requested multicast stream to a RMR circuit between the router and a network element coupled to the subscriber circuit if the reference counter transitions from zero upon incrementing.

7. The method of claim 6, wherein incrementing comprises incrementing a reference counter that is associated with the group object with respect to an RMR protocol through an aggregation module.

8. The method of claim 7, further comprising removing the multicast stream from the RMR circuit if the reference counter transitions to zero upon decrementing.

9. The method of claim 6, further comprising decrementing the reference counter associated with the group object if no host of the subscriber circuit is receiving the multicast stream of the group object.

10. The method of claim 6, wherein incrementing a reference counter comprises incrementing a plurality of counters to track an aggregate state of the subscriber circuit for all multicast sources.

11. A non-transitory computer-readable storage medium comprising instructions that, when executed by a router, cause the router to perform operations comprising:
receiving a report from a host on a subscriber circuit, the subscriber circuit being coupled between the router and the host, an interface between the router and the host including, but not limited to, a Remote Multicast Replication (RMR) interface, the report indicating a request to receive a multicast stream, the multicast stream being associated with a group object;
associating the group object with the subscriber circuit in a record at the router;
receiving a leave message from a host on the subscriber circuit, the message indicating a request to stop receiving a traffic stream corresponding to a multicast group identified in the leave message;
sending a group specific query on the subscriber circuit, the group specific query being directed to hosts on the subscriber circuit and regarding only the multicast group of the received leave message;
removing the group object association with the subscriber circuit from the record at the router if, in response to the group specific query, no host of the subscriber circuit reports receiving the traffic stream corresponding to the multicast group identified in the leave message.

12. The computer-readable medium of claim 11, the operations further comprising:
incrementing a reference counter associated with the group object upon receiving the request to receive the multicast stream; and
adding the requested multicast stream to a RMR circuit between the router and a network element coupled to the subscriber circuit if the reference counter transitions from zero upon incrementing.

13. The computer-readable medium of claim 12, wherein incrementing comprises incrementing a reference counter that is associated with the group object with respect to an RMR protocol through an aggregation module.

14. The computer-readable medium of claim 12, wherein incrementing comprises incrementing a plurality of counters to track an aggregate state of the subscriber circuit for all multicast sources.

15. The computer-readable medium of claim 12, the operations further comprising decrementing the reference counter associated with the group object if no host of the subscriber circuit is receiving the multicast stream of the group object.

16. The computer-readable medium of claim 15, further comprising determining whether a host of the subscriber circuit is receiving the group object by determining whether any reports are received in response to the group specific query.

17. The computer-readable medium of claim 15, the operations further comprising removing the multicast stream from the RMR circuit if the reference counter transitions to zero upon decrementing.

18. A router coupled to sources of multicast streams and to multicast consumer hosts through one or more network elements, the router configured to manage multicast streams sent to hosts through the one or more network elements using subscriber circuits, an interface between the router and the one or more network elements including, but not limited to, a Remote Multicast Replication (RMR) interface, the router comprising:
an ingress module to receive a report from a host on a subscriber circuit, the subscriber circuit being coupled between the router and the host, the router being coupled with the one or more network elements through the RMR interface, the report indicating a request to receive a multicast stream, the multicast stream being associated with a group object, and the ingress module to receive a leave message from a host on the subscriber circuit, the leave message indicating a request to stop receiving a traffic stream;
an egress module to send a group specific query on the subscriber circuit, the group specific query being directed to hosts on the subscriber circuit and regarding only the group object of the received leave message;
the ingress module being further to receive reports from hosts on the subscriber circuit in response to the query; and
a network processor to associate the group object with the subscriber circuit in a record at the router and to remove the group object association with the subscriber circuit from the record at the router if no host of the subscriber circuit is receiving the multicast stream of the group object.

19. The router of claim 18, wherein the router egress module is further to send the multicast stream to the one or more network elements through the RMR interface, if the multicast stream is not already being sent through the RMR interface.

20. The router of claim 19, wherein the network processor is further to maintain a reference counter associated with the group object, the network processor incrementing the reference counter if a new group object is associated with a subscriber circuit and decrementing the reference counter if no host of the subscriber circuit is receiving a multicast stream of a group object, the reference counter being used to manage streams on the RMR interface.

* * * * *